US008286587B2

(12) United States Patent
Sladkowski et al.

(10) Patent No.: US 8,286,587 B2
(45) Date of Patent: Oct. 16, 2012

(54) SECTION ANIMAL FEEDER

(76) Inventors: Roy Paul Sladkowski, High River (CA);
David George Hill, Strathmore (CA)

(*) Notice: Subject to any disclaimer, the term of this patent is extended or adjusted under 35 U.S.C. 154(b) by 512 days.

(21) Appl. No.: 12/623,551

(22) Filed: Nov. 23, 2009

(65) Prior Publication Data
US 2011/0120380 A1    May 26, 2011

(51) Int. Cl.
*A01K 1/10* (2006.01)
(52) U.S. Cl. .................. 119/51.11; 119/57.1; 119/61.31
(58) Field of Classification Search ............... 119/51.11, 119/51.12, 51.15, 57.1, 57.92, 61.31, 712
See application file for complete search history.

(56) References Cited

U.S. PATENT DOCUMENTS

| | | | | |
|---|---|---|---|---|
| 5,794,562 A * | 8/1998 | Hart | | 119/52.4 |
| 6,666,169 B2 * | 12/2003 | Dehod | | 119/731 |
| 2006/0070578 A1 * | 4/2006 | Pavlik | | 119/51.11 |
| 2007/0181069 A1 * | 8/2007 | Jack | | 119/61.1 |
| 2009/0020073 A1 * | 1/2009 | Hansen | | 119/51.11 |
| 2010/0132617 A1 * | 6/2010 | Lienemann | | 119/58 |
| 2010/0212597 A1 * | 8/2010 | Wolfe | | 119/58 |
| 2011/0253053 A1 * | 10/2011 | Kurtz | | 119/60 |

FOREIGN PATENT DOCUMENTS

CH    612821 A5 *  8/1979
* cited by examiner

*Primary Examiner* — Kimberly Berona
(74) *Attorney, Agent, or Firm* — Miller Thomson LLP; Tai W. Nahm

(57) ABSTRACT

A sectional animal feeder including an external frame assembly having a base, a series of adjustable spaced openings, and a series of panels. The sectional feeder further includes a movable internal frame assembly having a series of spaced openings, a series of panels and a drive system adapted to engage and move the internal frame assembly relative to the external frame assembly between a closed and opened position. A safety gating assembly may be mounted to the external frame assembly and may include a biased gate adapted to engage the animal during the moving of the movable internal frame assembly to a closed position. The sectional feeder also includes a Pavlovian response signal system having a timed auditory signal. The activation of the drive assembly moves the movable internal frame assembly whereby the series of spaced openings align with the series of adjustable space opening of the external panel and coincides with the timed auditory signal allowing access to the feeder.

20 Claims, 6 Drawing Sheets

SECTION ANIMAL FEEDER

FIELD OF THE INVENTION

This invention relates in general to animal feeders and more particularly to an automated livestock feeder having controlled access using a timed gating mechanism.

BACKGROUND OF THE INVENTION

Many livestock feeders include a peripheral wall to contain feed, and with head and neck stocks to prevent animal entry into the feeder. Such feeders provide the function of containing feed in a central location and seek to reduce feed waste by minimizing feed that is trampled.

There is however an impetus for controlling access to feed in many species of livestock in an effort to maintain proper body weight and health. Overfeeding can contribute to specific diseases in livestock and feed waste creates an unnecessary economic burden for the owner. Smaller feed portions, given at specific times of the day, are a more ideal method of feeding. Thus, manual feeding of certain livestock was considered the safest and most reliable method of controlling appropriate and regular feed portions.

Prior art animal feeders have been devised to address the noted problems. For example, U.S. Pat. No. 5,582,131 issued on Dec. 10, 1996 to Curtis and relates to a livestock feeder gate is described for removable mounting to an existing livestock feeder. The gate includes a closure having a peripheral wall enclosure extending between open top and bottom ends. The closure is shaped to be slidably received over the livestock feeder and is moveable thereon between an open position to permit livestock access to the livestock feeder, and a closed position blocking livestock access to the livestock feeder. A lift is mounted to the closure and is connectable to the feeder, for moving the closure between the open and closed positions. A timer controls operation of the lift.

U.S. Patent Application No. 2006/0070578 for Pavlik which was published on Apr. 6, 2006 relates to a livestock hay saver which protects hay from the elements and contamination. The apparatus has timer-operated doors which provide control to completely automated means for providing feed to horses and cattle. Its battery-operated, solar-recharged power system makes it completely portable and minimizes the need for user attention or maintenance.

U.S. Pat. No. 6,779,487 which issued on Aug. 24, 2004 to Kochan relates to an automated livestock feeder for storing and dispensing food such as hay or granular feed in a feed container, to an animal at predetermined intervals utilizes a tray control flange which releases a feed tray on which feed sets. At a predetermined feeding time a motor rotates the flanged latch thereby releasing the tray to rotate from a storage position to a dispense position. The invention generally comprises a housing containing a feed tray supported by the housing defining a compartment for supporting and protecting feed, and a tray control flange for supporting each feed tray. The activation mechanism includes an electrical power source, a timer relay/mechanical switch, and an electrical motor.

U.S. Pat. No. 6,779,486 which issued on Aug. 24, 2004 to Vaags relates to an animal feeder system and comprises a mobile feeder suspended from an overhead track. The track can conveniently be made from pipe bent into a desired configuration. The mobile feeder has an on-board computer controller and a computer-controlled motor which can drive the mobile feeder to feed drops located along the track. The mobile feeder has a number of feed compartments which each hold a feed ingredient. The ingredients are dispensed simultaneously by variable speed augers. A customized blend of feed ingredients is dispensed at each feed drop. The animal feeder system can automatically track the amount of feed consumed at each feed drop and can run unattended. Applications include feeding swine, horses, chickens, fish, cattle and other animals which are reared in captivity.

Although prior art animal feeders address some of the issues they do not as individual inventions, or as a group, satisfactorily address all of the concerns, nor do they adequately address the issue of livestock safety.

The present invention provides a solution to the problem of overfeeding by providing controlled access to the feed, for limited amounts of time, at regular intervals, as determined by the owner/operator. This invention stores large quantities of feed, reducing the labour required to refill the feeder. This invention provides protection for the feed from the weather in remote field placement and ensures availability of healthy feedstocks. This invention is fully scalable and can be expanded as needed to accommodate the number of animals. This invention is fully adjustable to ensure the maximum safety for the animals it is serving. This invention is designed to be fabricated from rigid and durable materials thereby providing reliable operation and long life. This invention provides a "call to feed" annunciation system utilizing the Pavlovian Response, that ensures the livestock are aware that feed has become available and thereby ensures equal access to the feedstock.

Thus a sectional animal feeder which provides controlled and measured access to feed, large storage capacity, with improved safety is desirable.

SUMMARY OF THE INVENTION

An object of one aspect of the present invention is to provide an improved sectional animal feeder.

In accordance with one aspect of the present invention there is provided a sectional animal feeder including an external frame assembly having a base, a series of adjustable spaced openings, and a series of panels. The sectional feeder further includes a movable internal frame assembly having a series of spaced openings, a series of panels and a drive system adapted to engage and move the internal frame assembly relative to the external frame assembly between a closed and opened position. A safety gating assembly may be mounted to the external frame assembly and may include a biased gate adapted to engage the animal during the moving of the movable internal frame assembly to a closed position. The sectional feeder also includes a Pavlovian response signal system having a timed auditory signal. The activation of the drive assembly moves the movable internal frame assembly whereby the series of spaced openings align with the series of adjustable space opening of the external panel and coincides with the timed auditory signal allowing access to the feeder.

Conveniently, the safety gating assembly further comprises a spring biased panel adapted to engage a series of door stops mounted on the external frame assembly.

Preferably, the drive system further includes a series of rollers adapted to engage a profile of the internal frame assembly and are mounted to the external frame assembly or the internal frame assembly. Moreover the drive system further includes a motorized drive for moving the internal frame assembly between the closed and open position relative the external frame assembly. The motorized drive may be powered by a rechargeable battery.

Advantages of the present invention are a sectional, stationary apparatus that provides controlled access to either square or round bales, or to loose hay, multiple access gates in a linear or rotary design, or in a single gate individual box stall configuration, each opening in the outer wall is adjacent to an adjustable shoulder bar that limits the width of the opening to accommodate similar sized animals, the feeder includes safety gates that are free to open at any time but are held in the closed position by specifically sized torsion springs allowing the animal to retract its head and neck through the safety gate eliminates any possible head pinch during the gate closure, the animal feeder moves from a closed or open position by a geared drive motor controlled by a digital timer that can have multiple open/close cycles per day, with any reasonable open duration programmed, and an audible signalling system triggers a Pavlovian response, which alerts the livestock to available feed.

BRIEF DESCRIPTION OF THE DRAWINGS

A detailed description of the preferred embodiments is provided herein below by way of example only and with reference to the following drawings, in which.

Figure 1:
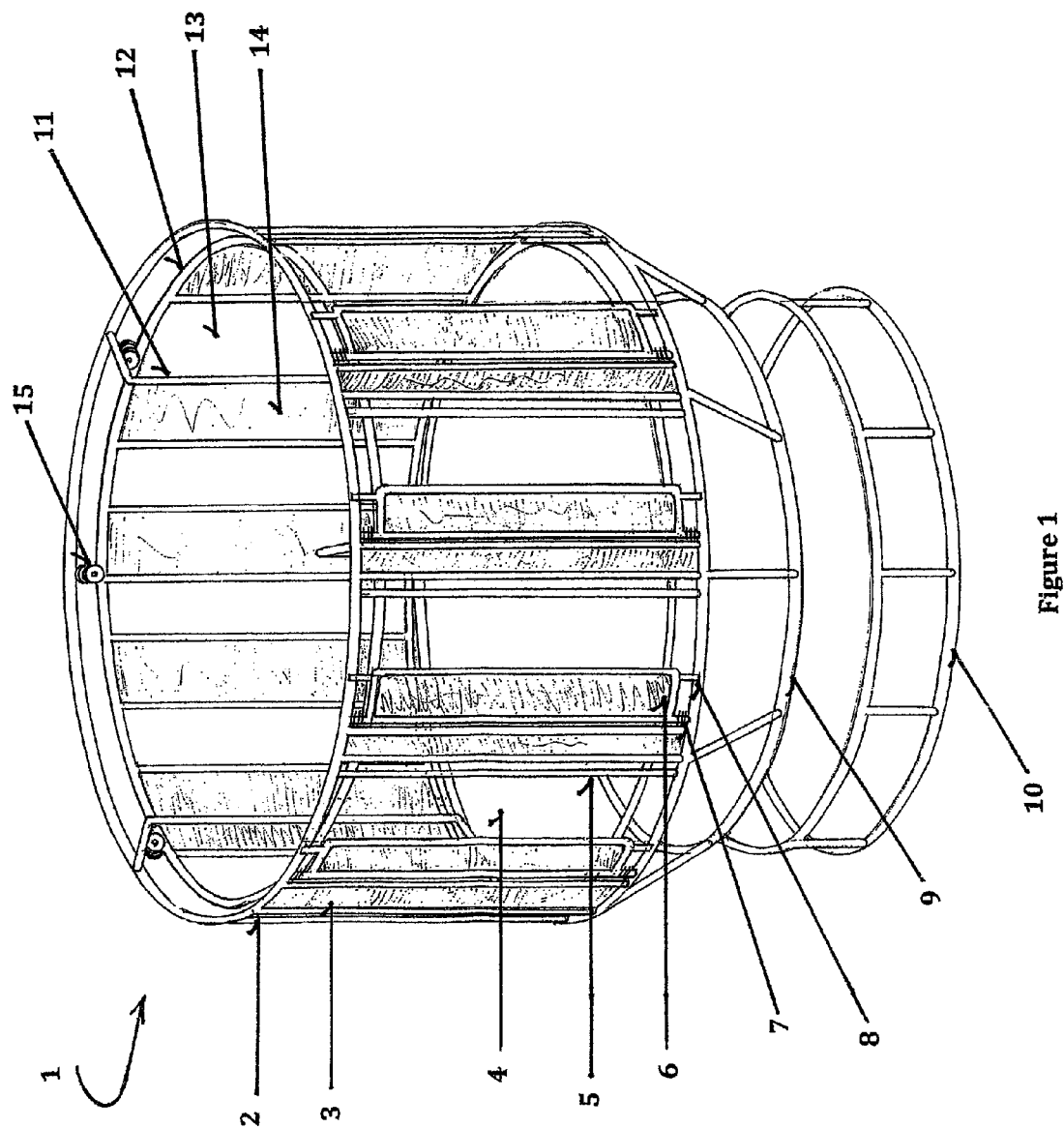
FIG. 1 is a perspective view of the preferred embodiment of the rotary controlled access feeder equipped with safety gates and optional elevation base.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Referring to FIG. 1, there is illustrated in a perspective view, a sectional animal feeder in accordance with a preferred embodiment of the present invention. The sectional animal feeder includes an external frame assembly having a base, a series of adjustable spaced openings, and a series of panels. The sectional feeder further includes a movable internal frame assembly having a series of spaced openings, a series of panels and a drive system adapted to engage and move the internal frame assembly relative to the external frame assembly between a closed and opened position. A safety gating assembly may be mounted to the external frame assembly and may include a biased gate adapted to engage the animal during the moving of the movable internal frame assembly to a closed position. The sectional feeder also includes a Pavlovian response signal system having a timed auditory signal. The activation of the drive assembly moves the movable internal frame assembly whereby the series of spaced openings align with the series of adjustable space opening of the external panel and coincides with the timed auditory signal allowing access to the feeder.

The safety gating assembly further comprises a spring biased panel adapted to engage a series of door stops mounted on the external frame assembly.

Moreover the rotary controlled access feeder of FIG. 1, (1) and is a stationary freestanding unit that is composed of similar sections attached to form a 360-degree cylindrical assembly. The feeder (1) is shown round, however, such feeders may also be constructed in a partial arc, 90 degrees, 120 degrees, or any combination thereof, or a linear arrangement for interior or exterior placement. The sectional design provides for fully scalable assembly and facilitates storage, shipping, and assembly.

A preferred form of the rotary feeder is shown that incorporates an external framework (2) of tubular steel with a sheet metal skin (3) where required to contain the feed and restrict access.

The external frame (2) incorporates equally spaced openings (4) that allow access to the feed contained within. Adjustable position shoulder bars (5) are incorporated to limit the width of the opening, to allow head and neck entry, but not the shoulders. These shoulder bars can be repositioned to accommodate livestock of a similar size.

Each opening (4) is fitted with a self-closing safety gate (6). These safety gates are held closed by specifically sized torsion springs (7) at the top and bottom of the door pivots. The doors are free to be pulled open at any time but will automatically return to the closed position and rest on the doorstops (8). These doors are also skinned with sheet metal.

The feeder incorporates a recessed base (9) that allows for forward hoof placement preventing any injury to the animal's legs, knees or feet and furthermore, limiting wear on the feeder.

Figure 2:
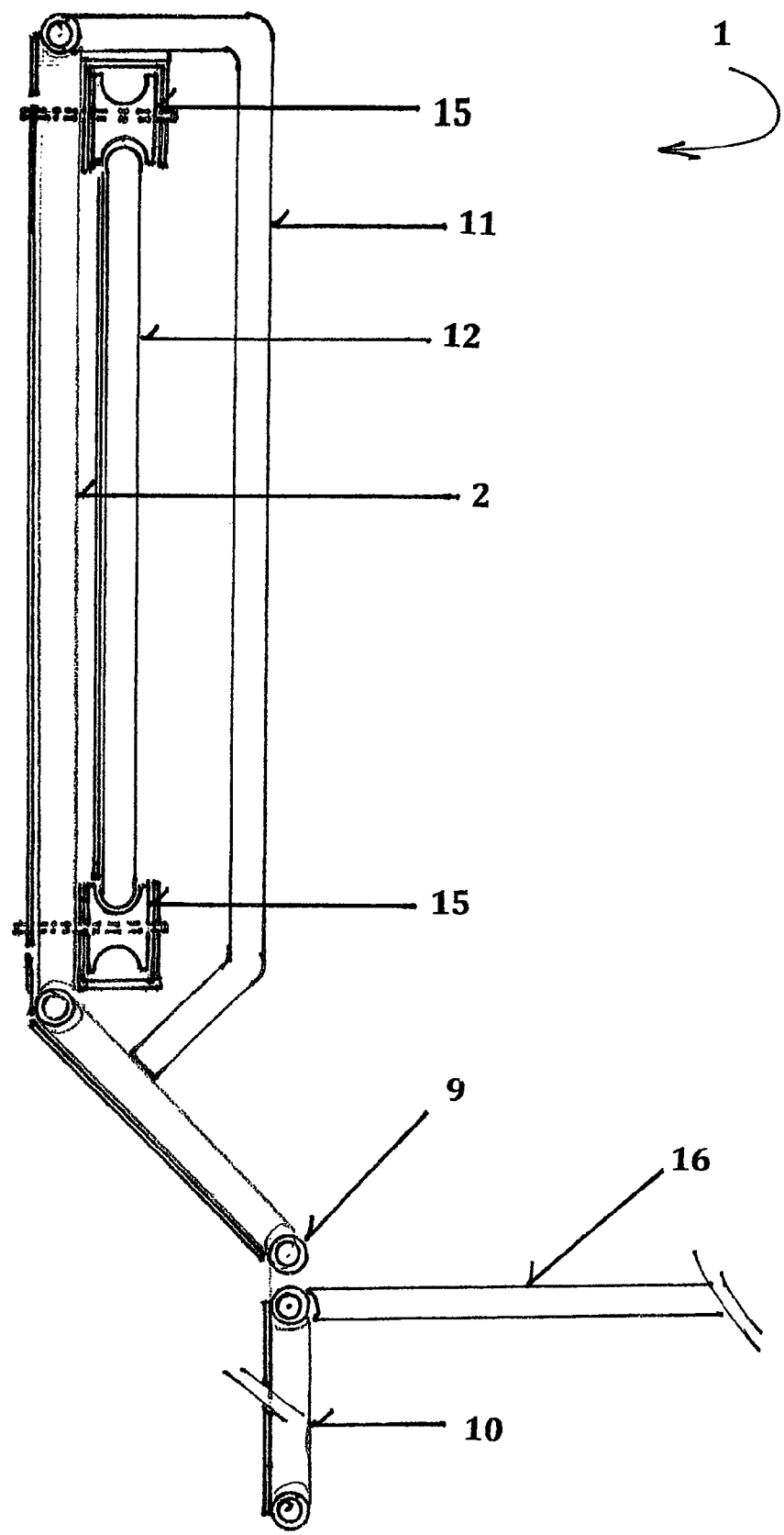
FIG. 2 in a cross sectional side view of the rotary feeder frameworks, safety gates, and elevation base.

The feeder can incorporate optional elevation pedestals (10) to suit larger/taller livestock. These elevation pedestals incorporate a floor frame FIG. 2, (16).

There are internal bale/feed standoff bars (11) or a feed positioning device for positioning the feed with the animal feeder that centre the feed within the feeder and prevent interference with the moving internal frame (12).

The internal frame (12) incorporates equally spaced openings (13) alternated with equally spaced metal skinned closure panels (14). This internal frame is supported, top and bottom, by specifically designed concave rollers (15) attached to the outer frame (2). These rollers allow the internal frame (12) to oscillate, forward and reverse, driven by a gear motor (not illustrated).

This gear motor is powered by 12 volts D.C. provided by an enclosed battery (not illustrated) allowing for remote field placement. The motor is controlled by either a 24-hour seven-day electronic timer (not illustrated) or by a manual override switch (not illustrated). The battery charge is maintained by either a 120 volt A.C. supply and appropriate 12 volt D.C. charger (not part of this device) or by the optional solar charge panels (not illustrated). Adjustable micro switches (not illustrated) control the open and closed positions of the internal frame (12). The electronic timer can be preset to operate multiple open/close cycles per day with any reasonable open duration programmed.

Not illustrated in the drawings, but nonetheless integral to this patent, is the "call to feed" annunciation system utilizing the Pavlovian Response. This system provides a loud audible notification that the rotary feeder is opening to allow feeding for the preset period of time. Livestock will rapidly learn to respond to this audible notification.

Sequence of Operation

When the internal skinned closure panels (14) are aligned behind the external frame openings (4) the livestock have no access to the feed.

When the timer, or manual override switch, is triggered for feed access, the drive motor is energized and the internal frame (12) starts to rotate/drive forward. An audible "call to feed" is initiated. When the internal frame (12) reaches its open position, with internal frame openings (13) aligned behind the external frame openings (4), the position micro switch stops the rotation and cancels the audible "call to feed". The feeder remains in this position for the duration of the pre-programmed feed time.

When the timer, or manual override switch, is triggered for closure, the drive motor is energized and the internal frame (12) starts to rotate/drive reverse. As the internal frame (12) rotates closed a new animal may be reluctant to quit its feeding. The internal frame (12) may apply pressure to the animal's neck forcing a reaction and a retraction of its neck and head. This retraction is facilitated by the free opening of the safety gate (6) and further facilitated by the offset between the internal and external frames (12) and (2). The safety gate (6) automatically returns to its closed position on its doorstops (8) and the internal frame continues to its closed position. The position micro switch stops the rotation at the closed position.

Figure 3:
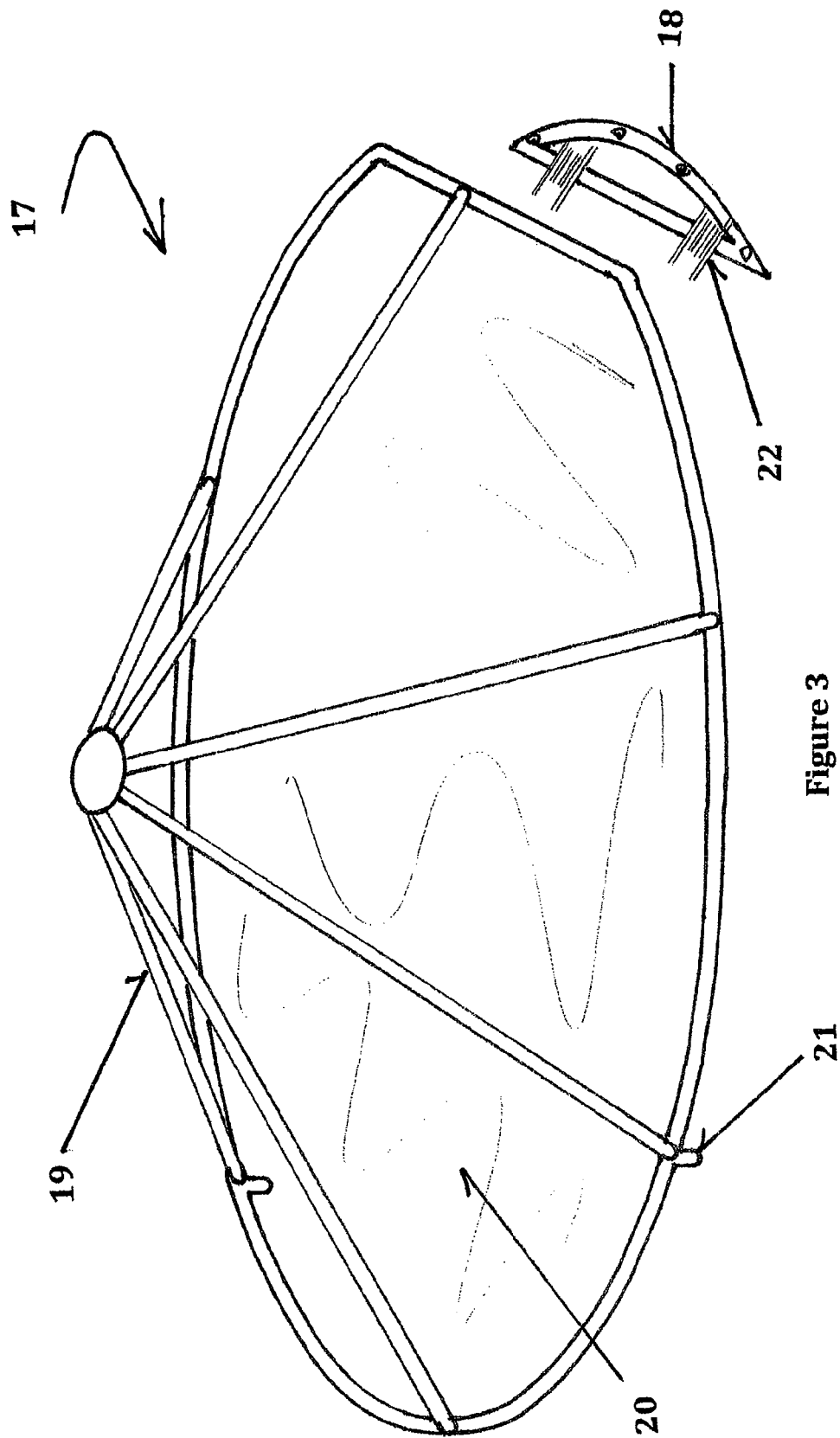
FIG. 3 is a perspective view of the roof framework for the rotary feeder.

A hinged roof/lid is generally designated in the drawings as FIG. 3, (17). This roof/lid incorporates a hinged base (18) attached by means of bolts to the rotary feeder outer frame FIG. 1, (2). The roof/lid is composed of a framework (19) of sufficient pitch and skinned with metal/plastic sheet or coated fabric (20). The frame incorporates closed position alignment pins/plates (21) and specifically sized torsion springs (22) to ease opening.

Figure 4:
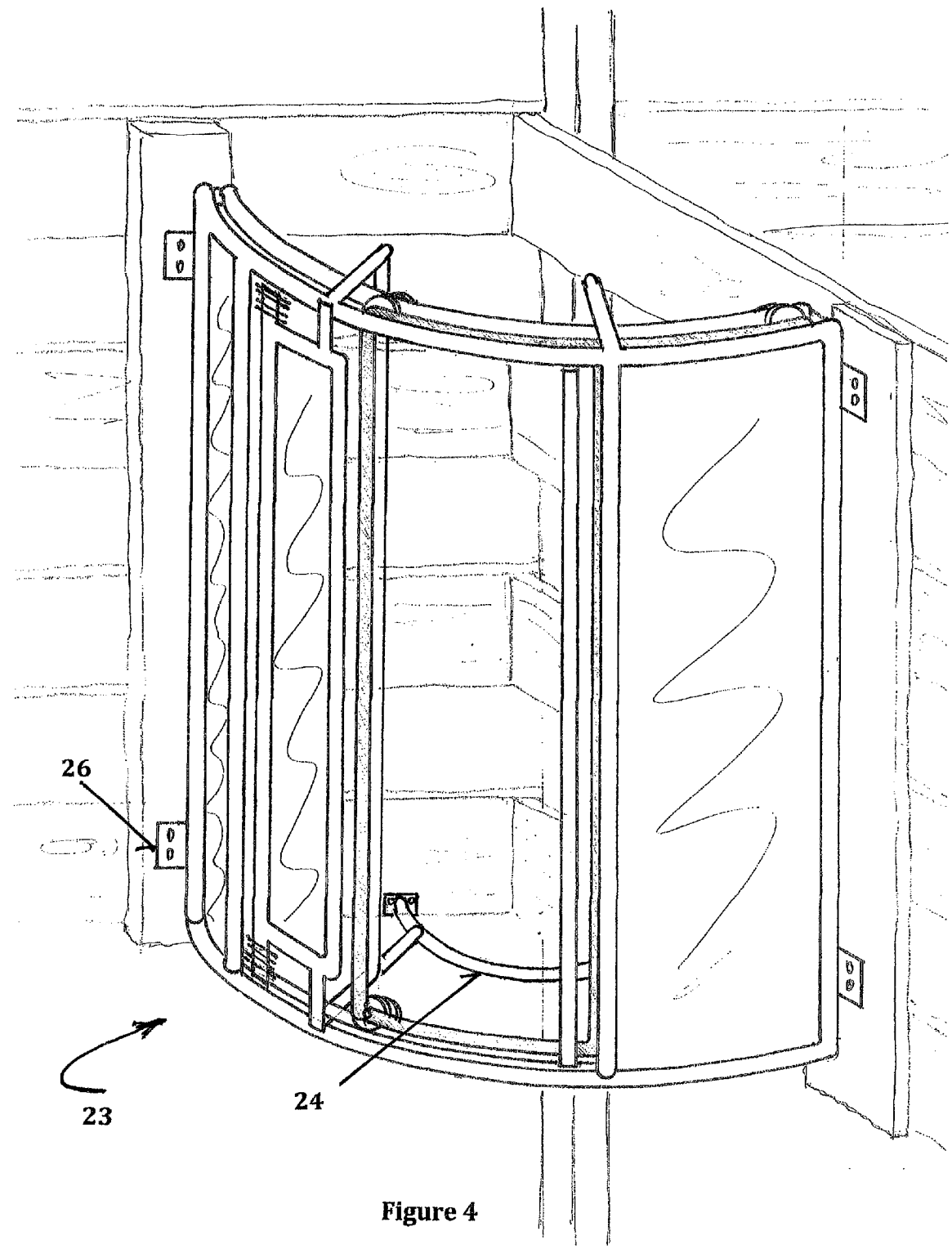
FIG. 4 is a perspective view of the rotary-arc stall mounted feeder.
Figure 5:
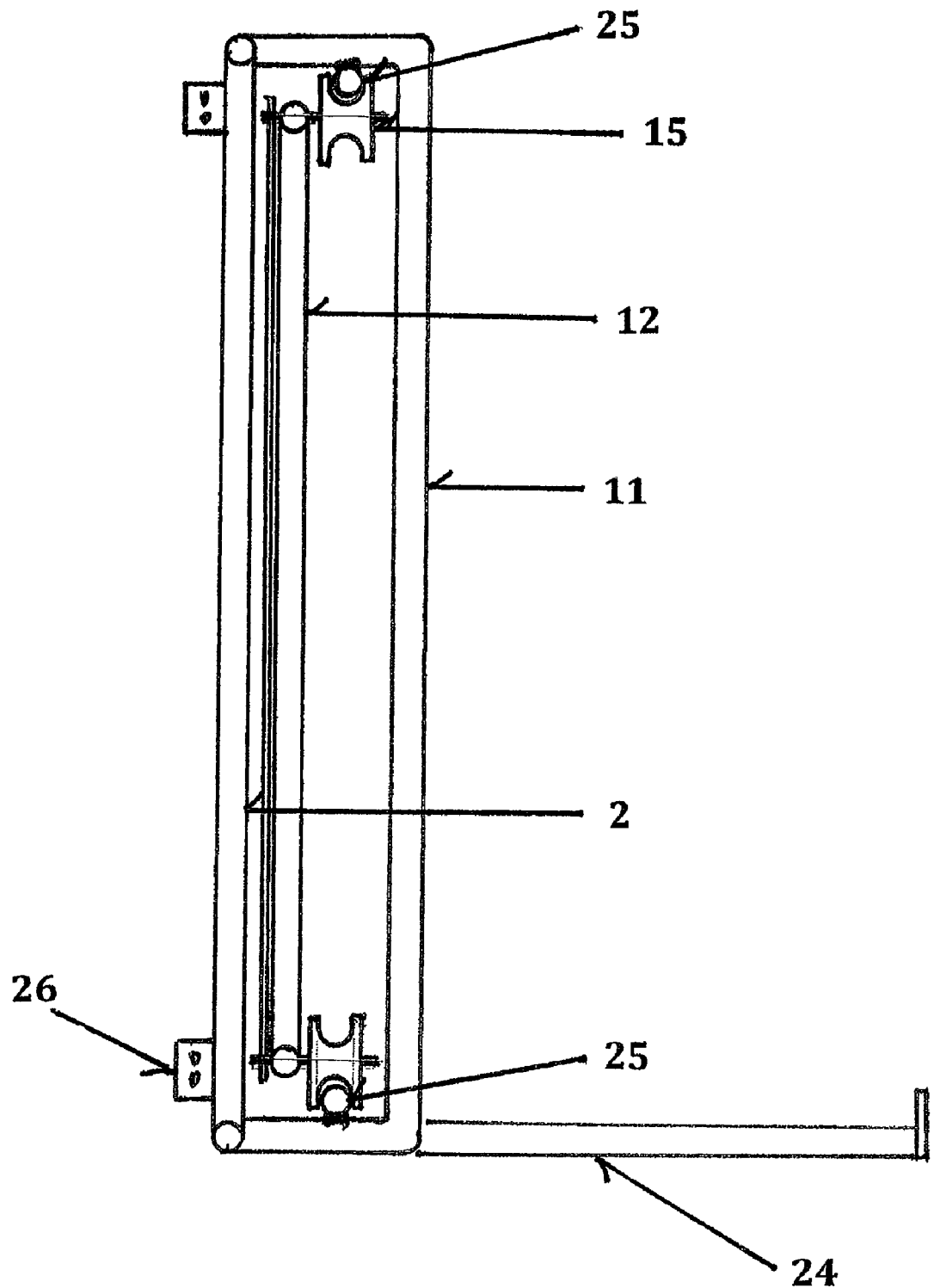
FIG. 5 is a cross sectional side view of the rotary-arc feeder frameworks.

The rotary-arc (stall) controlled access feeder equipped with alternate gate mounted rollers is generally designated in the drawings as FIG. 4. (23) and incorporates many of the features of the rotary/linear feeder FIG. 1, (1). The key differences are that this unit is designed with a fixed floor frame (24) and that the specifically designed concave rollers FIG. 5, (15) are attached to the internal frame (12) as opposed to the external frame (2). This internal frame (12) then oscillates forward and reverse on auxiliary, top and bottom, tracks (25). The rotary-arc feeder is attached to stall walls, or scaled up to 90, 180, 270, 360 degrees of circumference by means of brackets (26).

Figure 6:
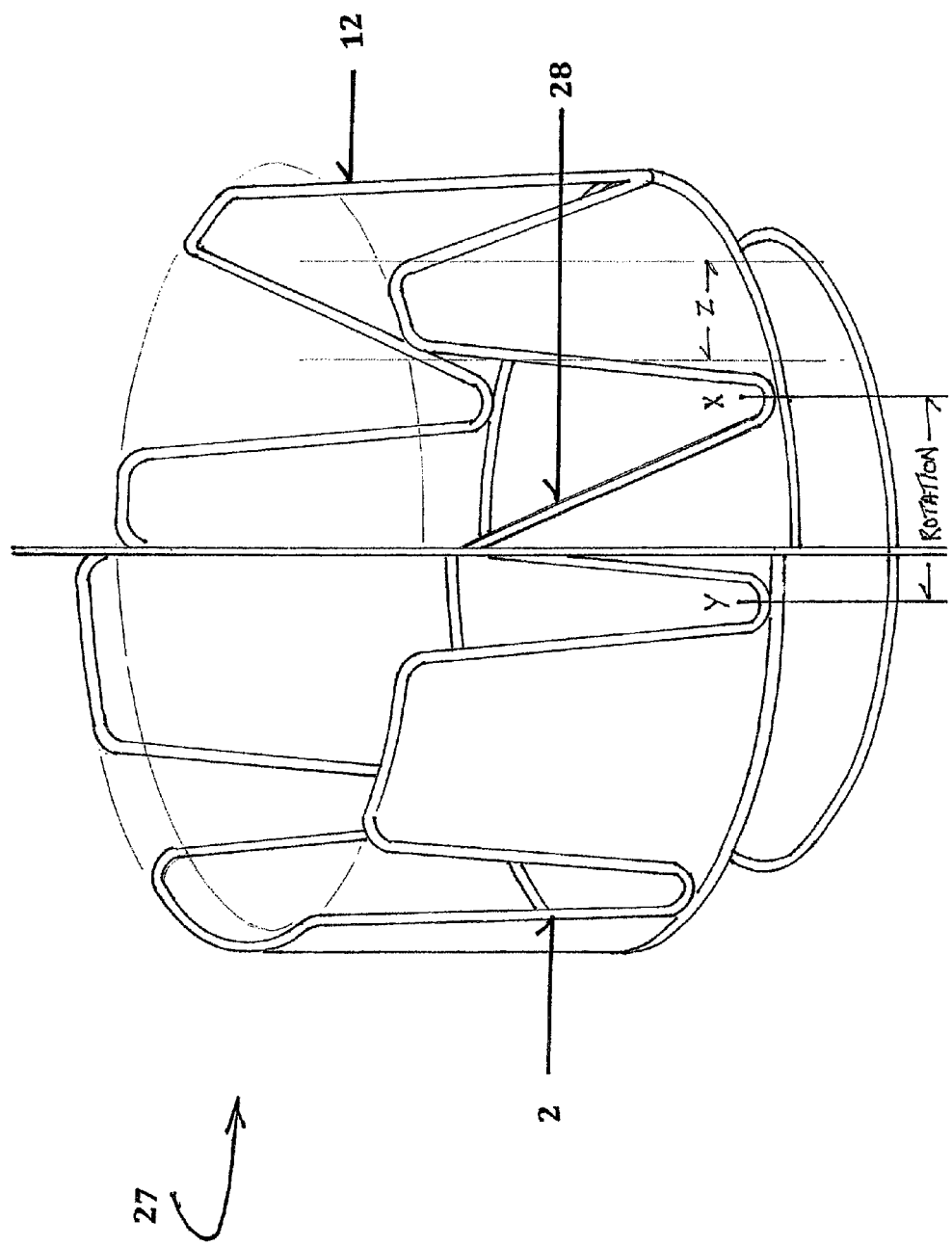
FIG. 6 is a perspective, and composite, view of the alternate ramp-gates for the rotary controlled access feeder.

The rotary/linear feeder can be designed with an alternate ramp-gate configuration as generally designated in composite FIG. 6, (27). This feeder also incorporates many of the features of the rotary feeder FIG. 1, (1). The external frame (2) is stationary; the internal frame (12) oscillates forward and reverse. Since there are no top rails on either the external frame (2) or the internal frame (12), the ramp-gate feeder does not require safety gates. As the feeder closes, the angle of the leading edge of the internal frame (28) forces the livestock to lift their heads until they are clear of the feeder and the access openings become fully blocked. There are no parallel bars to create a pinch. Rollers, drive motors, etc. have been omitted for clarity.

This invention has been described in specific terms as to shapes, materials, components, configurations, assembly, etc. It must be stressed however that the invention is not limited to those attributes only as described. The concept of rotary/linear gate closure, the scalability of one or more rotary-arc sections being combined, the concept and design of the safety gate system, the concept and design of the ramp-gate, the recessed base to allow for hoof placement, the pedestal base for height adjustment, the adjustable shoulder stop bar, the bale stand-off bars, and the "call to feed" annunciation system utilizing the Pavlovian Response, are all claimed individually and as specific to this patent and are claimed in all their forms in accordance with the doctrine of equivalents.

There has been illustrated in the accompanying drawings, and described hereinabove, several unique and novel preferred embodiments of the present invention which could be constructed in various sizes, shapes, configurations and from various components and materials.

Other variations and modifications of the invention are possible. All such modifications or variations are believed to be within the sphere and scope of the invention as defined by the claims appended hereto.

We claim:

1. A sectional animal feeder comprising:
   (a) an external frame assembly having a base, a series of adjustable spaced openings, and a series of panels;
   (b) a movable internal frame assembly having a series of spaced openings, a series of panels and a drive system adapted to engage and move the internal frame assembly relative to the external frame assembly between a closed and opened position;
   (c) a safety gating assembly mounted to the external frame assembly having a biased gate adapted to engage the animal during the moving of the movable internal frame assembly to a closed position; and
   (d) a Pavlovian response signal system having a timed auditory signal;
   wherein activation of the drive assembly moves the movable internal frame assembly whereby the series of spaced openings align with the series of adjustable space opening of the external panel and coincides with the timed auditory signal allowing access to the feeder.

2. A sectional animal feeder as claimed in claim 1 wherein the safety gating assembly further comprises a spring biased panel adapted to engage a series of door stops mounted on the external frame assembly.

3. A sectional animal feeder as claimed in claim 1 wherein the external and internal frame assembly are tubular in construction.

4. A sectional animal feeder as claimed in claim 3 wherein the series of panels for both the external and internal frame assemblies are sheet metal skin.

5. A sectional animal feeder as claimed in claim 1 wherein the adjustable spaced openings further comprises adjustable shoulder bars that adjust the width of the spaced openings.

6. A sectional animal feeder as claimed in claim 1 wherein the base of the external frame assembly is a recessed base relative to the series of panels and spaced openings.

7. A sectional animal feeder as claimed in claim 6 wherein the animal feeder further comprises an elevation pedestal.

8. A sectional animal feeder as claimed in claim 6 wherein the animal feeder further comprises a feed positioning device for positioning the feed with the animal feeder.

9. A sectional animal feeder as claimed in claim 1 wherein the drive system further comprises a series of rollers adapted to engage a profile of the internal frame assembly and are mounted to the external frame assembly or the internal frame assembly.

10. A sectional animal feeder as claimed in claim 9 wherein the drive system further comprises a motorized drive for moving the internal frame assembly between the closed and open position relative the external frame assembly.

11. A sectional animal feeder as claimed in claim 10 wherein the motorized drive is powered by a rechargeable battery.

12. A sectional animal feeder as claimed in claim 11 wherein the drive system further comprises a twenty four hour, seven day electronic timer.

13. A sectional animal feeder as claimed in claim 12 wherein the battery is maintained by photovoltaic charger.

14. A sectional animal feeder as claimed in claim 1 wherein the animal feeder further comprises a removal roof.

15. A sectional animal feeder as claimed in claim 14 wherein the removal roof is hinged to the external frame assembly.

16. A sectional animal feeder as claimed in claim 1 wherein the external frame assembly is mounted to a wall.

17. A sectional animal feeder as claimed in claim 1 is circular in shape.

18. A sectional animal feeder comprising:
  (a) an external frame assembly having a base, a series of adjustable spaced openings, and a series of panels;
  (b) a movable internal frame assembly having a series of spaced openings, a series of panels and a drive system adapted to engage and move the internal frame assembly relative to the external frame assembly between a closed and opened position, and
  (c) a Pavlovian response signal system having a timed auditory signal;
  wherein activation of the drive assembly moves the movable internal frame assembly whereby the series of spaced openings align with the series of adjustable space opening of the external panel and coincides with the timed auditory signal allowing access to the feeder.

19. A sectional animal feeder as claimed in claim 18 wherein the drive system further comprises a series of rollers adapted to engage a profile of the internal frame assembly and are mounted to the external frame assembly or the internal frame assembly.

20. A sectional animal feeder as claimed in claim 19 wherein the drive system further comprises a motorized drive for moving the internal frame assembly between the closed and open position relative the external frame assembly.

* * * * *